INVENTOR:
EDWARD F. PLATZ
BY
ATTORNEYS.

United States Patent Office 3,302,659
Patented Feb. 7, 1967

3,302,659
MULTIPLE GOVERNOR VALVE ASSEMBLY
Edward Francis Platz, Detroit, Mich., assignor to Ford Motor Company, Dearborn, Mich., a corporation of Delaware
Filed Mar. 23, 1964, Ser. No. 353,870
3 Claims. (Cl. 137—54)

My invention relates generally to speed sensing mechanisms and more particularly to a two-stage governor valve assembly capable of sensing the driven speed of a torque delivery shaft.

My invention is adapted especially to be used for establishing a pressure signal that is proportional in magnitude to the driven speed of a driven shaft in a driveline installation for an automobile vehicle. The signal that it produces may be utilized by a control system for an automatic power transmission mechanism to initiate automatic speed ratio changes and to condition the power transmission mechanism for any driving condition.

My improved governor mechanism is adapted to be used in a control system for an automatic power transmission mechanism having at least three forward driving speed ratios. The governor assembly produces a pressure signal that changes as the driven speed changes, and it is characterized by two operating zones. In one operating zone the signal that is produced is utilized by the control system to produce a speed ratio shift from an intermediate speed ratio to a high speed ratio. While operating in another zone the governor valve mechanism produces a signal that is utilized to establish a speed ratio change from the lowest speed ratio to the intermediate speed ratio.

The magnitudes of the signals at each speed ratio shift differ substantially in comparison to two-stage governor valve mechanisms of known design. Because of this characteristic the valve system can be made more responsive and the governor signal itself is more reliable as an indicator of the actual driven speed at each shift point.

The provision of a two-stage governor valve mechanism of the type above set forth being an object of my invention, it is a further object of my invention to provide a governor valve assembly capable of modulating control pressure supplied to it to produce a speed signal that is related functionally in magnitude to the driven speed whenever the driven speed is greater than a predetermined value and wherein the signal is substantially equal to zero when the driven speed is less than that predetermined value. I contemplate that the first speed ratio change will occur as soon as the driven speed reaches that predetermined value and that the second speed ratio change will occur at a higher driven speed at which the speed signal is substantially greater than the signal at which the first speed ratio change occurs.

It is a further object of my invention to provide a two-stage governor valve assembly capable of producing a pressure signal that is proportional in magnitude to the driven speed of a driven member and which includes a bipartite valve assembly having a secondary valve portion that functions as a modulator valve and a primary valve portion that inhibits operation of the secondary valve portion when the speed of the driven member is less than a predetermined value.

It is a further object of my invention to provide a centrifugally operated ball and cam arrangement for establishing a governor valve operating thrust force that is proportional to the driven speed.

Further objects and features of my invention will become apparent from the following description and from the accompanying drawings, wherein.

Figure 1:
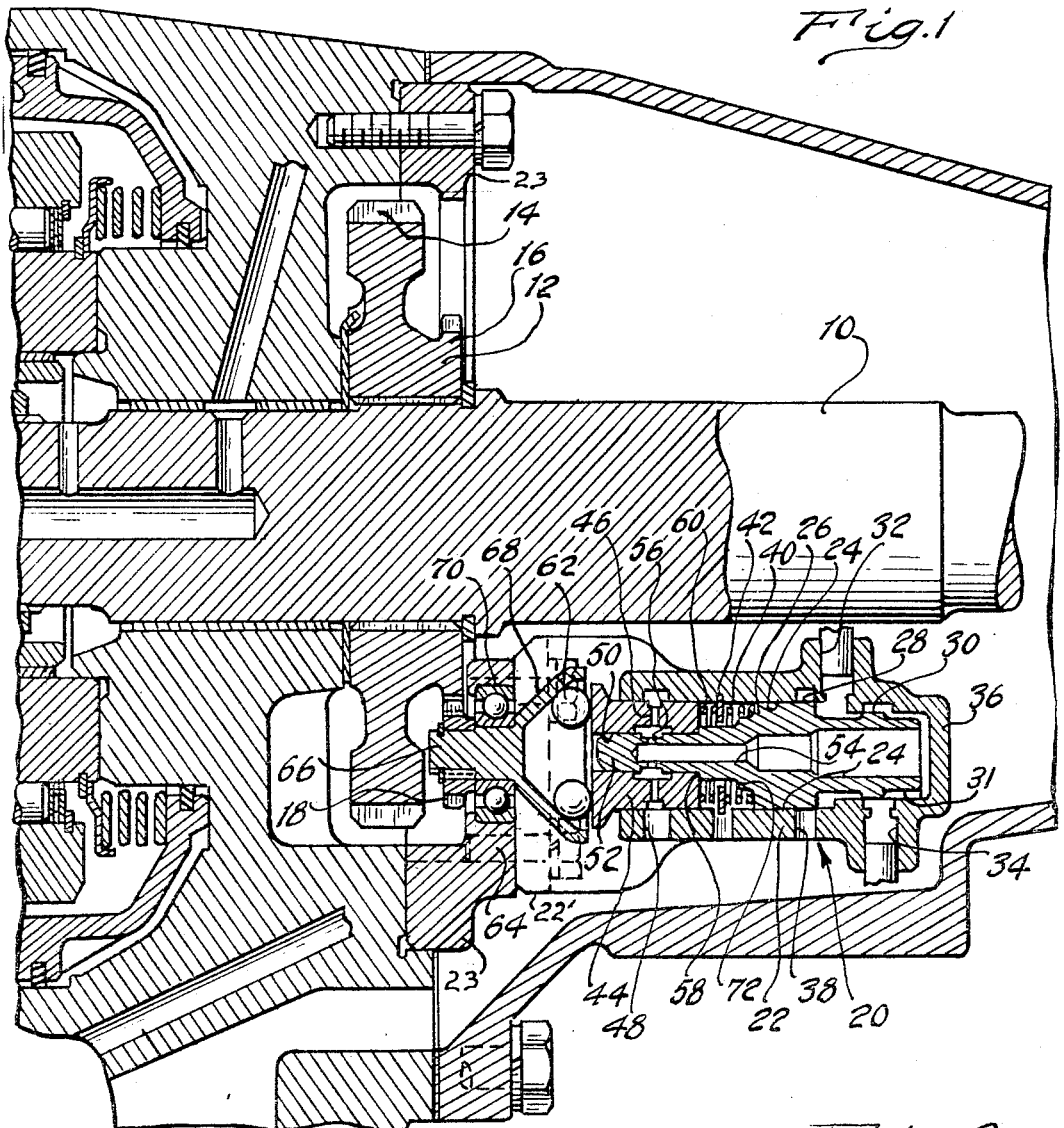
FIGURE 1 shows a cross sectional assembly view of my improved speed sensor.

Numeral 10 designates the driven shaft of a power transmission mechanism. Splined to shaft 10 is a gear 12 having teeth 14 that may form a part of a positive acting parking brake mechanism. Teeth 14 can be engaged by a pawl that in turn is controlled by the vehicle operator.

Formed on gear 12 is a governor drive gear 16 that meshes with a drive pinion 18 for a governor valve assembly identified generally by reference character 20. Assembly 20 includes a valve body 22 having a valve bore 24 formed therein. The body 22 may be connected to or form a part of the housing for the power transmission mechanism. In the embodiment shown, a flange 22′ on body 20 is bolted to ring 23 which in turn is bolted to the housing.

Slidably disposed within valve bore 24 is a secondary valve spool 26 having a pair of axially spaced valve lands 28 and 30 which cooperate with internal valve lands formed in the valve bore 24. A governor pressure outlet passage 32 communicates with the bore 24 at a location intermediate valve lands 28 and 30. A control pressure supply passage 34 communicates with the bore 24 at a location adjacent valve land 30. The end of the bore 24 is enclosed by end wall 36.

An exhaust port 38 communicates with the bore 24 at a location directly adjacent valve land 28.

The diameter of valve land 28 is larger than the diameter of valve land 30 and the pressure in passage 32 acts upon the differential area defined by these lands to urge the valve spool 26 in a left-hand direction. This pressure force is opposed by the force of valve spring 40 situated between the valve spring seat 42 and the end of valve spool 26.

Upon movement of the spool 26 in a left-hand direction communication is established between exhaust port 38 and the governor pressure outlet passage 32. Upon movement of the valve spool 26 in a right-hand direction the degree of communication between passage 34 and the differential area on the valve spool is increased. At the same time the degree of communication between passage 32 and the exhaust port 38 is decreased. Passage 34 is in continuous communication with the right-hand side of the valve spool 26 through flow restricting flats 31.

Slidably situated within the left-hand end of bore 24 is a primary valve element 44. It is formed with an exhaust passage 46 that communicates with an exhaust port 48 when the valve element 44 assumes the position shown. Valve element 44 is formed with a circular opening 50 that receives an extension 52 of the valve element 26. Valve element 26 is formed with a central opening 54 that establishes communication between the right-hand end of valve bore 24 and a radial opening 56, the latter communicating with passage 46. When the valve element 44 assumes the position shown, it engages a stop 58 formed on the extension 52. A spring 60 is situated between valve element 44 and the seat 42 for urging normally the valve element 44 in a left-hand direction into engagement with centrifugally actuated balls 62.

The ring 23 includes a boss 64 which is adapted to rotatably journal the hub 66 of a circular cam 68. Hub 66 is supported by a ball bearing 70 that is received within a bearing opening formed in the boss 64. The pinion 18 is carried by the hub 66.

Balls 62 engage the surface of cam 68. They are urged radially outwardly as the cam 68 is rotated. The balls 62 roll on the surface formed on the left-hand side of the valve element 44. Thus, the balls exert an axial thrust force on the valve element 44 that is functionally related in magnitude to the speed of the shaft 10.

Valve spool 26 is formed with a shoulder 72 that engages the spring seat 42 when the shaft 10 is stationary. At that time the valve element 44 is urged in a left-hand direction by valve spring 60 to seal the passage 46 from the port 48 thereby interrupting communication between passage 54 and the exhaust region. As the shaft 10 begins to rotate the balls 62 will exert an axial thrust upon the valve element 44 which opposes the force of spring 60. When a predetermined shaft speed is reached (e.g. 400 r.p.m.) the passage 46 is brought into communication with exhaust port 48.

Prior to the time the port 48 is uncovered, a relatively high control pressure is distributed through passage 34 to the right-hand side of the valve spool 26 through the flats 31 on the right end of spool 26. This urges the valve spool 26 in a left-hand direction causing shoulder 72 to engage seat member 42. As soon as the passage 46 is uncovered, however, the pressure on the right-hand side of the valve spool 26 is exhausted through the port 48 thereby allowing the spring 40 to urge the spool 26 in a right-hand direction. This allows pressure to be distributed from passage 34 to the differential area of lands 28 and 30 as exhaust passage 38 in body 22 becomes closed. The increased pressure on the differential area tends to cause the spool 26 to move in a left-hand direction against the force of spring 40 and the centrifugal force and to cause the passage 34 to be closed off while exhaust passage 38 is opened thus exhausting the pressure until the force of spring 40 urges the spool back in a right-hand direction. Finally, a force balance is achieved. Valve spool 26 thus will tend to modulate and produce a resultant pressure in passage 32. Upon a further increase in speed the balls 62 will urge the valve element 44 in a right-hand direction until it engages the shoulder 58. At that time the thrust that is created due to the centrifugal force acting upon the balls 62 influences the operation of the valve spool 26. As the driven speed of the shaft 10 increases, the thrust acting through the valve element 44 upon the valve spool 26 is increased. This force is opposed, of course, by the pressure acting on the area differential of valve lands 28 and 30. Upon a further increase in speed the pressure in passage 32 will vary in a nonlinear fashion to a maximum value at some appropriate point.

Figure 2:
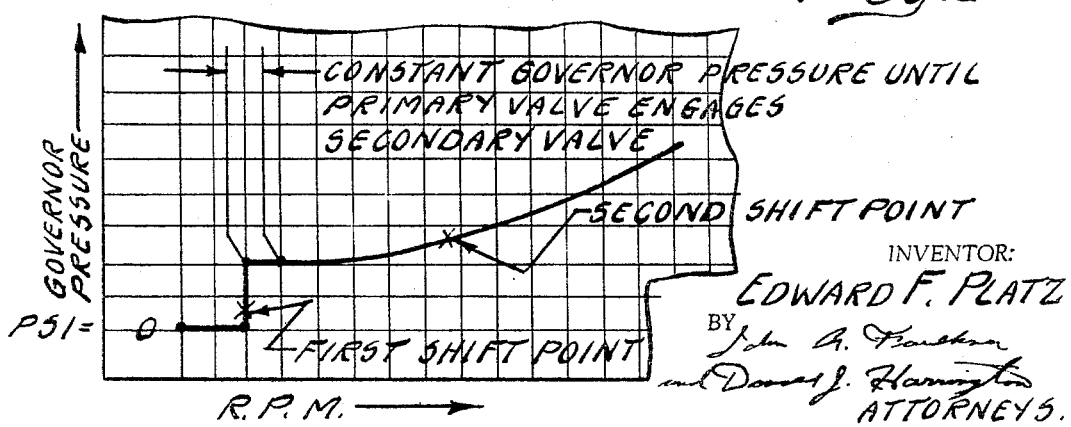
FIGURE 2 is a chart showing the operating characteristics of the assembly of FIGURE 1.

I have illustrated in FIGURE 2 the speed-pressure characteristics of the mechanism of FIGURE 1. The magnitude of the pressure in passage 32 will be substantially zero at any speed of shaft 10 between zero and 400 r.p.m. When the speed of 400 r.p.m. is reached the passage 46 becomes uncovered and the valve 26 begins to modulate. This results in an immediate increase in the pressure in passage 32 from zero to approximately 12 pounds. As the speed increases further the pressure in passage 32 will remain relatively constant until the valve element 44 engages the shoulder 58. After this occurs the pressure in passage 32 will vary nonlinearly with respect to changes in the speed of shaft 10.

I contemplate that the control system can be calibrated so that the second speed ratio shift will occur along the nonlinear portion of the curve. I contemplate also that the first speed ratio shift will occur at a pressure corresponding to a point along the vertical portion of the operating curve of FIGURE 2. Since the pressure differential between the two shift points is rather substantial, the reliability of the signal as it initiates speed ratio changes is improved.

Having thus described a preferred embodiment of my invention, what I claim and desire to secure by U.S. Letters Patent is:

1. A fluid pressure operated governor valve mechanism for producing a pressure signal that is proportional in magnitude to the driven speed of a driven member comprising a valve body, a valve chamber formed in said valve body, a secondary modulator valve element situated in said valve chamber, means for supplying control pressure to said valve chamber, means for distributing governor pressure from said valve chamber, primary valve means for inhibiting the modulating action of said secondary valve element, centrifugally operated weights engageable with said primary valve means, and a rotary cam adapted to contact said weights and to create a non-radial component of the centrifugal force acting on the latter, said cam being drivably connected to said primary valve means to overrule the inhibiting action of the same when the speed of rotation of said driven member increases to a value greater than a predetermined value.

2. In a governor valve assembly for use in creating a pressure signal that is related in magnitude to the driven speed of a driven member, a valve body, a valve chamber formed in said valve body, secondary valve means situated in said valve chamber, a pressure supply passage for distributing control pressure to said valve chamber, a governor pressure distributor passage means for distributing pressure from said valve chamber, a primary valve means situated in said valve chamber for modulating the control pressure distributed thereto to produce a resultant signal in said governor pressure passage means that is related functionally to the driven speed of said driven member, a pressure area on said secondary valve means, an exhaust passage communicating with said pressure area, centrifugally operated cam means drivably connected to said driven member for creating a thrust upon said primary valve means that acts in one direction, and means for urging said primary valve element in the opposite direction to close said exhaust passage and inhibit the operation of said secondary valve means at speeds of rotation of said driven member less than a given value, said primary valve means engaging said secondary valve means and transmitting therethrough the thrust of said centrifugally operated cam means when the speed of rotation of said driven member exceeds said predetermined value.

3. In a governor valve means heaving two operating stages, a valve body, a valve chamber situated in said valve body, means for supplying control pressure to said valve chamber, governor passage means communicating with said valve chamber at a location spaced from said control pressure supply means, secondary valve means in said valve chamber adapted to modulate the pressure supplied thereto, an exhaust passage communicating with an area on said secondary valve means and with an exhaust port, first spring means for normally biasing said secondary valve means in one direction, primary valve means communicating with and partly defining said exhaust passage means, and a mechanical rotary cam having centrifugally operated portions engageable with said primary valve means and adapted to urge the same in a first direction into an exhaust passage exhausting position when the speed of rotation of said cam exceeds a predetermined value and other spring means for urging said primary valve means in a direction opposite to said first direction toward an exhaust passage blocking position, the pressure in said exhaust passage acting upon said secondary valve means to oppose the force of said first spring means when the speed of rotation of said cam is less than a predetermined value.

References Cited by the Examiner

UNITED STATES PATENTS

| | | | |
|---|---|---|---|
| 1,600,507 | 9/1926 | Marr | 137—54 |
| 2,588,140 | 3/1952 | McFarland | 137—56 X |
| 2,931,374 | 4/1960 | Randol | 137—54 |
| 2,962,037 | 11/1960 | Simon | 137—53 |
| 3,077,921 | 2/1963 | Zubaty | 137—53 X |
| 3,122,153 | 2/1964 | Rowland | 137—58 X |

CLARENCE R. GORDON, *Primary Examiner.*